Feb. 11, 1930.　　　M. S. FAIRHILL　　　1,746,996
AERO FUEL
Filed Oct. 22, 1929　　　2 Sheets-Sheet 1

INVENTOR
Morris S. Fairhill
BY
ATTORNEY

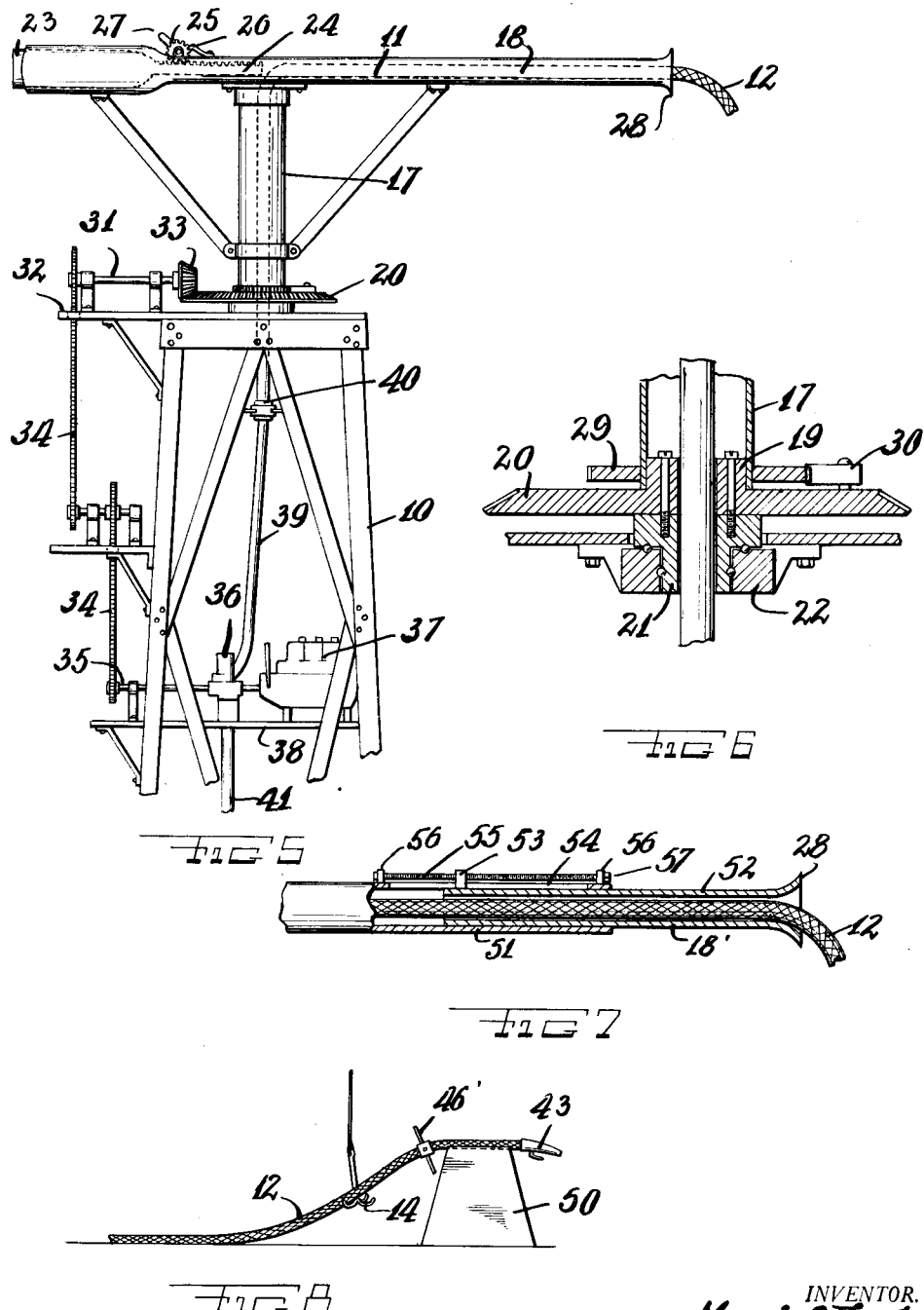

UNITED STATES PATENT OFFICE

MORRIS S. FAIRHILL, OF NEW YORK, N. Y., ASSIGNOR OF ONE-SEVENTH TO PAUL PERLIS, OF BROOKLYN, NEW YORK, ONE-SEVENTH TO CHARLES SCHULMAN, OF ASTORIA, LONG ISLAND CITY, NEW YORK, ONE-SEVENTH TO HARRY GREENBLATT, ONE-SEVENTH TO JACOB DONITZ, ONE-SEVENTH TO BENNY SHAPIRO AND ONE-SEVENTH TO BARNET SHAPIRO, ALL OF NEW YORK, N. Y.

AERO FUEL

Application filed October 22, 1929. Serial No. 401,595.

This invention relates to new and useful improvements in a refueling station for aeroplanes.

The invention has for an object the provision of a device of the class mentioned which is of simple durable construction, dependable in use and efficient in action, and which can be manufactured and sold at a reasonable cost.

The invention proposes a stationary tower, a member rotatively mounted on the tower, means for rotating said member, a longitudinal hose extended from the member for connection with an aeroplane during flight, and means for forcing fuel thru the hose.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 5 is an enlarged fragmentary view of a portion of Fig. 1.

Fig. 6 is an enlarged fragmentary sectional view taken on the line 6—6 of Fig. 2.

Fig. 7 is an enlarged view of a portion of Fig. 5 but illustrating a modification thereof, a portion of the parts being broken away for disclosing interior parts.

Fig. 8 is an enlarged perspective view of the free end of the hose supported according to modified means.

Figure 1:
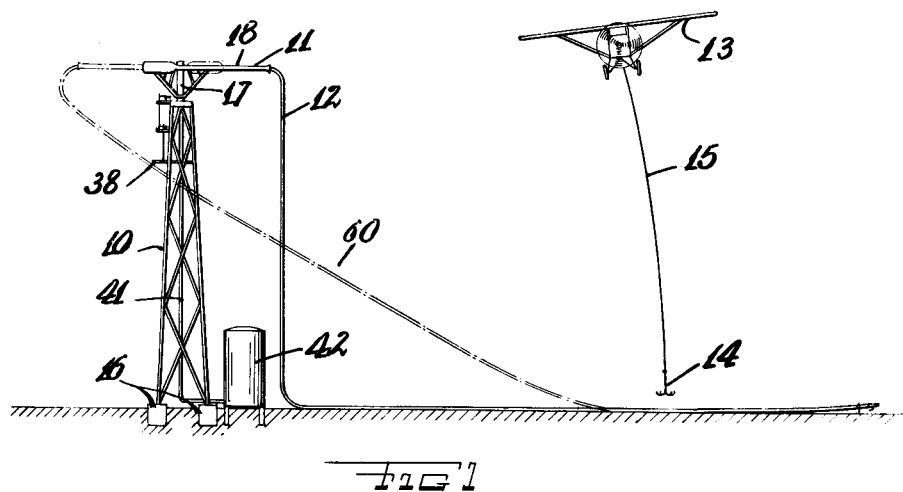
Fig. 1 is a side elevational view of a refueling station constructed according to this invention.
Figure 2:
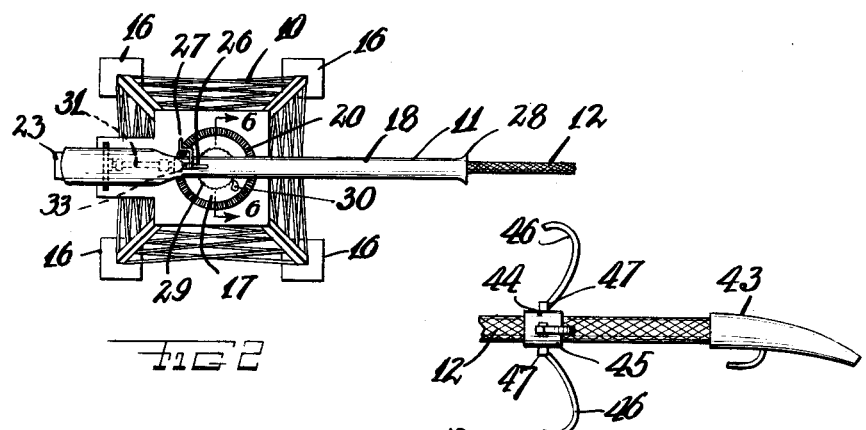
Fig. 2 is an enlarged fragmentary plan view of Fig. 1.
Figure 3:
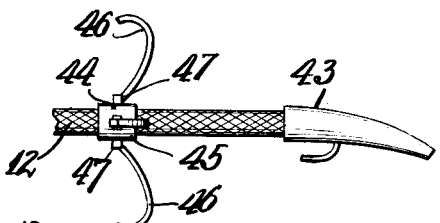
Fig. 3 is an enlarged side elevational view of the free end of the hose.
Figure 4:
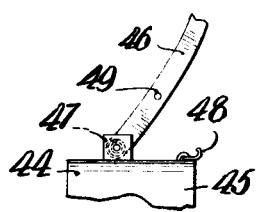
Fig. 4 is an enlarged fragmentary detailed view of a portion of Fig. 3.
Figure 9:
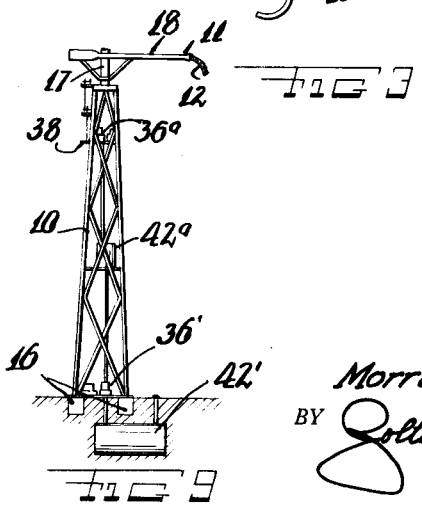
Fig. 9 is an elevational view showing a modified form of the tower layout.

The refueling station for aeroplanes consists of a stationary tower 10, a member 11 rotatively mounted on the tower, means for rotating said member 11, a longitudinal hose 12 extended from the member 11 for connection with an aeroplane during flight, and means for forcing fuel thru the hose 12. An aeroplane 13 is illustrated in Fig. 1 during flight and in the act of picking up the hose for refueling. The picking up is accomplished by a hook 14 suspended from the plane by a flexible member 15.

The said stationary tower 10 is preferably made of steel and built on concrete foundation blocks 16. The tower should be wide at the base and narrower at the top. The said member 11 which is rotatively mounted upon the tower consists of a vertical arm 17 supporting a horizontal arm 18. The vertical arm 17 is rotatively engaged upon a projection 19 from a bevel gear 20. A vertical peg 21 is attached upon the bottom of the bevel gear and is rotatively supported by a thrust bearing 22 attached upon the tower.

The said horizontal arm 18 is provided at one end with a counterweight 23 adapted for counterbalancing the other end of the arm and the complete hose 12 full with gasoline. A rack 24 is connected with the counterweight 23 which is slidably mounted within the horizontal arm 18. A pinion 25 is rotatively mounted upon the arm 18 and meshes with the rack. A catch 26 is supported upon the arm 18 and engages the pinion for holding it in fixed positions. A handle 27 connects with the pinion for its manual rotation. The other end of the horizontal arm 18 is flared as indicated by reference numeral 28 so as to reduce wearing of the hose 12 which extends from this end.

Said means for rotating the member 11 consists of a ratchet wheel 29 fixed upon the bottom of the vertical arm 17 and engaged by a spring pressed pawl 30 carried by the said bevel gear 20. A shaft 31 is rotatively supported upon a platform 32 attached upon the tower and carries a bevel gear 33 meshing with the said bevel gear 20. A sprocket and chain speed reduction 34 connects with the shaft 31 and with a shaft 35 connected with a pump 36 and with a motor 37. The pump and motor are mounted upon a platform 38 supported on the tower.

The hose 12 extends thru said horizontal arm 18 and thru said vertical arm 17 and is connected with a stationary pipe 39 connected with the outlet of the pump 36. A swivel connection 40 is used for connecting the hose with the said stationary pipe. The said means for forcing fuel thru the hose 12 consists of a supply pipe 41 connected with the inlet of the pump 36 and with a tank 42 mounted upon the ground. Gasoline or other fuel should be stored in the tank for use as needed.

Pump 36 and motor 37 may be arranged in any suitable manner on the same or on different platforms at different heights on the tower 10. One, two or more pumps of single, double or multiple action may be used for forcing the fuel into the hose 12. Other suitable arrangement of forcing the fuel up in the hose 12 may be provided such as a reservoir tank 42' may be placed in the ground near the tower 10 and a pump 36' located in the tower may force the fuel into an upper auxiliary tank 42ª located on a platform about 40 feet above the ground. About 40 feet above this first platform a double action pump 36ª is placed on another platform and is adapted to draw the fuel from the elevated tank into the hose 12.

The free end of the hose 12 is provided with a nozzle 43, and slightly to the rear of the nozzle with a support device 44. This support device consists of a collar 45 fixed upon the hose and pivotal arms 46 mounted upon the collar and held in extended positions by springs 47 coaxially mounted upon the pivot points. The support device 44 serves to slightly hold the hose spaced from the ground so that the hook 14 from the aeroplane may pick the same up. When the support device is not in use or when the operator of the tower desires that no aeroplane should pick up the hose, the pivotal arms 46 are moved to a horizontal position and clamped by hooks 48 mounted upon the collar and engageable in apertures 49 in the arms.

In the modified form illustrated in Fig. 8, another means has been shown for aiding the aeroplane in picking up the hose. This means consists of a fence 50 approximately five feet in height for supporting the hose. The hose is shown extended across two sides of the fence and the aeroplane in flight lowers the hook 14 for catching the hose as shown on the drawing. The collar 45 may have integral arms 46' for gripping same by the hook 14 to pull up the hose 12.

In Fig. 7, a modified form of horizontal arm 18' has been illustrated which is adapted for preventing excessive wear of the hose 12 at the portion of contact where the hose leaves the arm. The arm is constructed of adjustable length so that from time to time its length may be changed and thus change the contact of the hose. The adjustable length is accomplished by making the arm of two sections, namely a stationary section 51 and a slidable outer section 52. A lug 53 projects from the movable section thru a slot 54 in the stationary section and threadedly connects with a screw 55 rotatively mounted on the stationary section. Lugs 56 from the stationary section act as standards for the screw 55. One end of the screw is formed with a head 57 for connection with a turning tool. When desired the screw may be rotated for causing the movable section 52 to recede or extend and thus change the point of contact with the hose.

In operation of the device, an aeroplane during flight lowers the hook and catches the free end of the hose. The aeroplane then continues to fly in a circle around the tower. Immediately upon catching of the hose, the operator in charge of the tower places in operation the means for rotating the member 11 so that the aeroplane is relieved of some of the load of the hose which thereafter contains gasoline. In addition, the counterweight 23 is also depended upon to relieve some of the strains. The operator times the rotation of the member 11 so as to substantially keep up with the aeroplane.

In the event that the aeroplane travels faster than the rotation of the member 11, the member may idle due to the pawl and ratchet wheel arrangement 29 and 30. If the aeroplane travels slower than the rotation of the member, the hose will slightly wind around the tower as indicated by the dot and dash lines 60 in Fig. 1 but this is not dangerous since adjustments may be made before the hose is more than a half a turn around the tower.

It is estimated that the aeroplane can draw enough fuel for a flight of three thousand miles flying around the tower six times. After the aeroplane has obtained its supply it merely drops the hose. At the initial stage of refueling, after the persons on the aeroplane have connected the nozzle with their supply tanks, they signal to the operator of the refueling system to turn on the supply of gasoline so that it may be emptied into their storage tanks.

It is to be understood that any suitable means may be provided to carry the operator up to the operating platform 38, such as an elevator or the like, also stairways or ladders may be provided for reaching any part of the tower.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A refueling station for aeroplanes, comprising a stationary tower, a member rotatively mounted on the tower, means for rotating said member, a long hose extended from the member for connection with an aeroplane during flight, and means for forcing fuel thru the hose, said rotative member consisting of a vertical arm rotatively mounted and supporting a horizontal arm, a thrust bearing being mounted upon the tower and connected for supporting said vertical arm, a counterweight being arranged upon the horizontal arm for balancing the hose and contained gasoline.

2. A refueling station for aeroplanes, comprising a stationary tower, a member rotatively mounted on the tower, means for rotating said member, a long hose extended from the member for connection with an aeroplane during flight, and means for forcing fuel thru the hose, said rotative member consisting of a vertical arm rotatively mounted and supporting a horizontal arm, a thrust bearing being mounted upon the tower and connected for supporting said vertical arm, a counterweight being arranged upon the horizontal arm for balancing the hose and contained gasoline, said counterweight being adjustable relative to the point of rotation of the horizontal arm.

3. A refueling station for aeroplanes, comprising a stationary tower, a member rotatively mounted on the tower, means for rotating said member, a long hose extended from the member for connection with an aeroplane during flight, and means for forcing fuel thru the hose, the means for rotating said member consisting of a speed reduction unit connected with a motor, and a pawl and ratchet interposed between the member and said speed reduction unit for allowing the member to rotate faster than the rotations supplied by the motor.

4. A refueling station for aeroplanes, comprising a stationary tower, a member rotatively mounted on the tower, means for rotating said member, a long hose extended from the member for connection with an aeroplane during flight, means for forcing fuel thru the hose, and means for holding the free end of the hose slightly spaced from the ground so as to be catchable by a hook from an aeroplane during flight.

5. A refueling station for aeroplanes, comprising a stationary tower, a member rotatively mounted on the tower, means for rotating said member, a long hose extended from the member for connection with an aeroplane during flight, means for forcing fuel thru the hose, and means for holding the free end of the hose slightly spaced from the ground so as to be catchable by a hook from an aeroplane during flight, comprising a collar fixed a short distance from the free end of the hose, pivotal arms on the collar, and springs for holding the arms in radial positions.

6. A refueling station for aeroplanes, comprising a stationary tower, a member rotatively mounted on the tower, means for rotating said member, a long hose extended from the member for connection with an aeroplane during flight, means for forcing fuel thru the hose, and means for holding the free end of the hose slightly spaced from the ground so as to be catchable by a hook from an aeroplane during flight, comprising a fence for supporting the free end of the hose.

7. A refueling station for aeroplanes, comprising a stationary tower, a member rotatively mounted on the tower, means for rotating said member, a long hose extended from the member for connection with an aeroplane during flight, and means for forcing fuel thru the hose, said rotative member consisting of a vertical arm rotatively mounted and supporting a horizontal arm, a thrust bearing being mounted upon the tower and connected for supporting said vertical arm, said horizontal arm being of two sections adjustably connected for changing the area of contact of the hose leaving the free end of the arm.

8. A refueling station for aeroplanes, comprising a stationary tower, a member rotatively mounted on the tower, means for rotating said member, a long hose extended from the member for connection with an aeroplane during flight, means for forcing fuel thru the hose, a collar with radial arms near the free end of the said hose, and means for holding the free end of the hose slightly spaced from the ground so as to be catchable by a hook from an aeroplane during flight.

9. A refueling station for aeroplanes, comprising a stationary tower, a member rotatively mounted on the tower, means for rotating said member, a long hose extended from the member for connection with an aeroplane during flight, and means for forcing fuel thru the hose, said means consisting of a pump forcing the fuel from a tank at the ground to a tank on a platform, a second double action pressure pump located on a platform at a higher elevation than the first platform, forcing the fuel from the last said tank into the hose, said rotative member consisting of a vertical arm rotatively mounted and supporting a horizontal arm, a thrust bearing being mounted upon the tower and connected for supporting said vertical arm, said horizontal arm being of two sections adjustably connected for changing the area of contact of the hose leaving the free end of the arm.

In testimony whereof I have affixed my signature.

MORRIS S. FAIRHILL.